United States Patent [19]

Ito et al.

[11] Patent Number: 4,812,729
[45] Date of Patent: Mar. 14, 1989

[54] PROTECTING APPARATUS FOR SECONDARY EXCITATION TYPE VARIABLE SPEED AC GENERATOR/MOTOR

[75] Inventors: Akio Ito; Hidenori Sawa, both of Hitachi; Hiroshi Sugisaka, Takahagi; Shigeaki Hayashi, Suita; Hiroto Nakagawa, Osaka; Yasuteru Oono, Kobe; Eiji Haraguchi, Ibaraki, all of Japan

[73] Assignees: Hitachi Ltd.; The Kansai Electric, Tokyo, Japan

[21] Appl. No.: 84,805

[22] Filed: Aug. 13, 1987

[30] Foreign Application Priority Data

Aug. 19, 1986 [JP] Japan ................................ 61-193693
Dec. 1, 1986 [JP] Japan ................................ 61-286283

[51] Int. Cl.⁴ .............................................. H02P 5/40
[52] U.S. Cl. .................................... 318/732; 318/798; 318/806; 361/33; 363/57
[58] Field of Search ............... 318/731, 732, 827, 828, 318/798, 806, 760, 761; 361/30, 31, 33, 86, 87, 91, 92, 96; 363/55, 56, 57, 58, 160, 161, 162

[56] References Cited

U.S. PATENT DOCUMENTS

| | | | |
|---|---|---|---|
| 3,046,412 | 7/1962 | Seike | 363/56 |
| 3,800,198 | 3/1974 | Graf et al. | 318/806 |
| 3,852,656 | 12/1974 | Bourbeau | 363/58 |
| 3,942,092 | 3/1976 | Bourbeau et al. | 363/162 |
| 4,636,929 | 1/1987 | Nakamura et al. | 363/56 |

Primary Examiner—David Smith, Jr.
Attorney, Agent, or Firm—Antonelli, Terry & Wands

[57] ABSTRACT

There is disclosed a protecting apparatus for a secondary excitation type variable speed AC generator/motor having a primary winding connected to an electric power system and a secondary winding each phase of which is AC excited by an independent power converter unit. The protecting apparatus is arranged to detect an electrical event which includes at least one of an overvoltage and overcurrent appearing at each phase of the secondary winding of the AC generator/motor, to decide whether the detected electrical event meets a predetermined condition and to close, when the electrical event detected in respect to any of phases of the secondary winding is decided as meeting the predetermined condition, a switch circuit connected in the corresponding phase of the secondary winding.

17 Claims, 13 Drawing Sheets

PROTECTING APPARATUS FOR SECONDARY EXCITATION TYPE VARIABLE SPEED AC GENERATOR/MOTOR

BACKGROUND OF THE INVENTION

This invention relates to a protecting apparatus for secondary excitation type variable speed AC generator/motors and more particularly to a protecting apparatus adapted for a variable speed AC generator/motor connected to an electric power system and having a secondary winding which is AC excited by means of cycloconverters.

With regard to power controlling in a variable speed AC generator/motor such as an induction generator/motor connected to an electric power system, it has been known to control effective power and reactive power fed to and received from the electric power system by controlling secondary excitation for the motor, as disclosed in, for example, Japanese Patent Publication (Kokoku) No. 53-7628 published on Mar. 20, 1978 and No. 57-60645 published on Dec. 21, 1982. When this type of variable speed AC generator/motor is increased in capacity so as to be used as a large-capacity generator/motor in a pumping-up power station, the power line voltage is used to control secondary excitation currents by way of power converter units such as cyclo-converters.

In the event that a voltage variation occurs, due to an accident in the electric power system and/or an ON/-OFF operation of an AC breaker associated with another generator/motor, during controlling of the secondary current of the generator/motor, a DC transient component of primary current induces a rotating frequency component which is superimposed on a slip frequency current component on the secondary side. As a result, a current larger than the normal secondary current flows through a cyclo-converter. In such an event, if the value of this current can be suppressed to not larger than a rated range of the device such as the cyclo-converter, it is desirable from the standpoint of stabilization of the overall system that the power generation or the pumping-up operation is continued by separating out the parts which failed. To realize this operation, the withstanding ability of the device may conceivably increased but such an expedient is not only economically disadvantageous but also impossible to implement in many technical points if employed for a pumping-up generation apparatus of large capacity. Therefore, an overcurrent flowing through the cyclo-converter needs to be suppressed. But since the current suppressing control has to be done before the overcurrent reaches an overcurrent level of thyristors, detection of the accident in the electric power system must be discerned instantaneously.

On the other hand, an overcurrent will likewise flow for causes such as an internal accident of the cyclo-converter and/or a failure to commutate by the cyclo-converter. In such an event, the operation must be ceased instantaneously and controlling for suppressing damage of the master machine to a minimum must be undertaken. However, because of only detection of the overcurrent itself, it has hitherto been impossible to discern different causes for the occurrence of the overcurrent. It follows therefore that the conventional controlling is undertaken to simply stop the main machine upon occurrence of any type of accident wth a view of protecting the main machine, raising a problem that when it is applied to a variable speed pumping-up/power generation apparatus of large capacity connected to the electric power system, stability of the electric power system is degraded.

In the past, an overvoltage protector for a power converter unit of the type as disclosed in, for example, Japanese Patent Application (KOKAI) JP-A-58-12530 has been known. In this reference literature, when DC current is supplied to a DC load from the AC power supply via a power converter unit comprised of thyristor elements, the power converter unit can be protected against an overvoltage due to interference of a surge or the like stemming from the AC power supply by closing protecting thyristor switches connected in parallel with the thyristor elements in response to the application of the overvoltage across the thyristor elements. But, this prior art is far from protecting the power converter unit against an overvoltage induced in its secondary winding when an accident takes place in the electric power system to which the secondary excitation type AC generator/motor is connected and has of course nothing to do with the problem involved in continuity and stability of the operation of the electric power system. Another reference literature, Japanese Patent Application (KOKAI) JP-A-56-166796, may be referred to as disclosing a protector for a thyristor Scherbius device connected to the secondary winding of a secondary excitation type induction motor. Fundamentally, when an overvoltage occurs while the motor is running at speeds below the synchronous speed, the protector detects the overvoltage and causes thyristor switches to short-circuit the secondary winding, thereby protecting thyristor elements. Especially, in the latter prior art, a plurality of thyristor switches are connected in parallel and selected ones of the thyristor switches, which are selected in accordance with the rotating speed of the motor, are closed to minimize variations in torque of the motor. The latter prior art, however, fails to take account of the variable speed AC generator/motor having an operation range in which the secondary excitation is controlled so that it runs at speeds above the synchronous speed to serve as a generator.

Any of the prior art overvoltage protectors described above intend to protect the thyristor elements and supplementarily ensure stable operation of the motor and never teach a protecting apparatus operative to protect thyristor elements of each power converter that connected in the secondary excitation circuit for the variable speed AC generator/motor connected to the electric power system while taking account of continuity of the operation necessary for sustaining stability of the electric power system.

It is of significance to understand that when an accident occurs in the electric power system to which the variable speed AC generator/motor is connected, overvoltages do not appear concurrently at the three phases but an overvoltage is caused separately in each phase. Accordingly, if the secondary winding is short-circuited instantaneously in response to the occurrence of the overvoltage, the variable speed AC generator/motor will instantaneously shift to the motor operation when it is running at speeds below the synchronous speed to serve as a generator and will instantaneously shift to the generator operation when running at speeds above the synchronous speed to serve as a motor, thus inviting an increase in variation of torque and making continuity of the operation difficult.

SUMMARY OF THE INVENTION

An object of this invention is to provide a protecting apparatus for a variable speed AC generator/motor connected to an electric power system and having a secondary winding supplied with controllable exciting current through power converter units each comprised of thyristor elements, which protecting apparatus can protect the thyristor elements of each power converter unit from a secondary side overvoltage or overcurrent caused when a trouble occurs in the electric power system and can permit the generator/motor to continuously operate until the electric power system recovers from the trouble.

According to a first aspect of the invention, a protecting apparatus for a secondary excitation type variable speed AC generator/motor having a secondary winding which is AC excited through power converter units each comprised of thyristor elements is arranged to include a switch circuit comprised of a semiconductor switch means and a resistor and connected in each phase of the secondary winding, means connected to each phase of the secondary winding for detecting an overvoltage appearing at each phase, and means responsive to the overvoltage detected by the detecting means to close the switch circuit connected in the corresponding phase of the secondary winding.

According to a second aspect of the invention, a protecting apparatus for a secondary excitation type variable speed AC generator/motor having a secondary winding which is AC excited through power converter units each comprised of thyristor elements is arranged to include a semiconductor switch circuit connected in each phase of the secondary winding, means connected in each phase for detecting an input current supplied from the electric power system to a power converter unit connected in that phase, means connected in each phase for detecting an output current supplied from the power converter unit to each phase of the secondary winding, means for determining a difference between the input current and the output current in the corresponding phase, means for deciding, when the input current exceeds a predetermined value, the presence or absence of a trouble occurring in the power converter unit itself on the basis of the difference determined in respect of the corresponding phase, and means for stopping the operation of the AC generator/motor when it is decided that the power converter unit itself is in trouble and closing, when it is decided that the power converter unit itself is not in trouble, the semiconductor switch circuit connected in the corresponding phase of the secondary winding.

DESCRIPTION OF THE PREFERRED EMBODIMENTS

Figure 1:
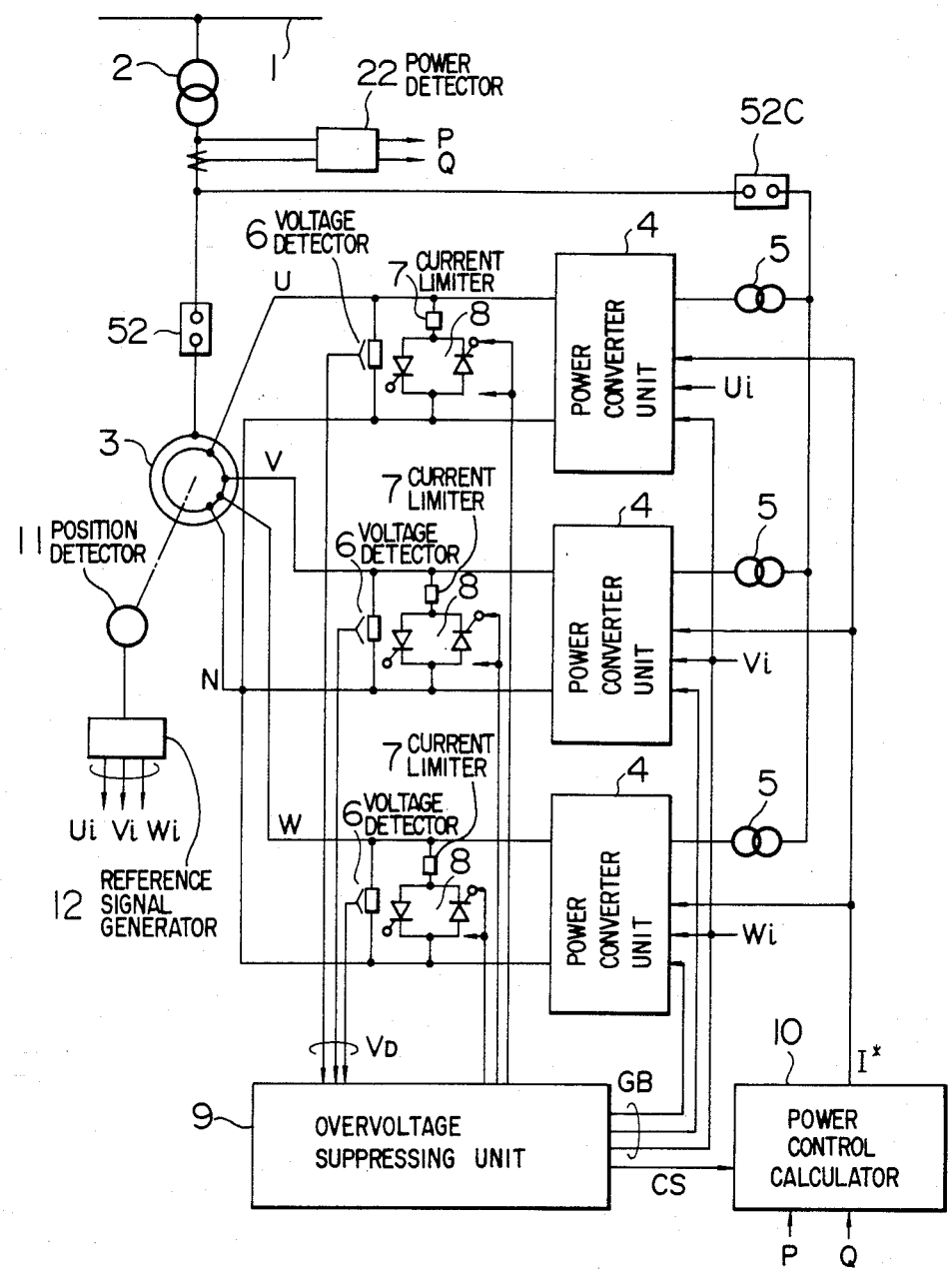
FIG. 1 is a block diagram showing the construction of the secondary winding exciting circuit of a variable speed AC generator/motor to which a protecting apparatus according to a first embodiment of the invention is applied.

Especially, in case of a large cavity of a variable speed AC generator/motor connected to an electric power system, it is required to use a large capacity of a power converter to excite the secondary winding of the variable speed AC machine. In such an instance, noncirculating current type cyclo-converters may be advantageously used for reducing the capacity of thyristors and that of other components.

With the cyclo-converters of this type used for the variable speed AC generator/motor, when the primary voltage of the generator/motor varies as a result of an accident occurring in the electric power system or due to other causes, a DC transient component on the primary side induces a rotating frequency component which is superimposed on a slip frequency on the secondary side, causing a secondary current of the rotating frequency component to flow on the secondary side. When this secondary current assumes the polarity which is inverse to the current polarity of thyristor elements of a cyclo-converter being presently in conduction, the cyclo-converter is urged to open and an overvoltage induced in a secondary coil is applied across the thyristor elements of the cyclo-converter, giving rise to damage of the thyristor elements. Due to the fact that the overvoltage develops in any cyclo-converter due to opening thereof in this manner, the cyclo-converters of the respective phases will not undergo overvoltages simultaneously because the cyclo-converters are controlled to close or open in different timings according to the three-phase excitation of the secondary winding. Accordingly, damage of the cylco-converters can be prevented by connecting a semiconductor switch in each phase of the secondary winding and closing a semiconductor switch connected in a phase at which an overvoltage develops. However, as far as an accident occurring in the electric power system is concerned, the magnitude of an overvoltage due to the accident depends on a geographical position at which the accident takes place, scale of the accident and a transient phenomenon following recovery from the accident. Therefore, the magnitude of the overvoltage is graded into two levels. Since there is a possibility that an overvoltage developing at higher level damages thyristor elements of the cyclo-converters connected in all phases, the semiconductor switches in all phases are turned on when such an overvoltage develops. An interval of time for turning on the semiconductor switches can be set using a timer. Preferably, the timer may be set to provide a setting time which reflects duration of generation of an overvoltage and systematic matching. When the semiconductor or thyristor switches in all phases are turned on, the cyclo-converters are placed in gate-off condition to stop their operation and effective power and reactive power can be suppressed in order to attain an effect that a difference among the cyclo-converters can be minimized at the time the cyclo-converters recover from the stoppage.

When an overvoltage develops at lower level, only a semiconductor or thyristor switch associated with a phase subject to the generation of the overvoltage is turned on to thereby protect thyristor elements of a cyclo-converter connected in this phase. Concurrently with disappearance of the overvoltage, the thyristor switch is turned off to permit the cyclo-converter to move into operation and recover the steady state instantaneously.

A first embodiment of the invention will now be described with reference to the accompanying drawings.

Referring to FIG. 1, the function of a main circuit according to the first embodiment of the invention will first be described. On the primary side, a variable speed AC generator/motor 3 is connected to an electric power system 1 by a main transformer 2 through an AC breaker 52. On the secondary side, each phase of the AC machine 3 is connected to an independent power converter unit 4 comprised of a cyclo-converter so as to undergo low frequency excitation. Each of the power converter units 4 is connected to the main transformer 2 by a transformer 5 through a common AC breaker 52C. The secondary winding of the AC machine 3 is of a four-line type having a neutral N. Connected across the neutral N and each phase U, V of W are a voltage detector 6 and a series circuit of a pair of thyristor switches 8 connected in anti-parallel relationship and a current limiting resistor 7. A position detector 11 directly coupled to the rotor of the AC machine 3 detects a relative position of each phase of the secondary winding to the primary winding of the AC machine, and a reference signal generator 12 responds to an output signal of the position detector 11 to generate a sinusoidal reference signal Ui, Vi or Wi for each phase having a slip frequency of AC excitation to be applied to the secondary winding of the AC machine and having a relative phase (to a phase of the power line voltage) determined by a relative electrical angular position of each phase of the secondary winding to the primary winding of the AC machine. The reference signals are supplied to the U-phase, V-phase and W-phase power converter units 4, respectively. Effective power P and reactive power Q supplied from the AC machine 3 to the electric power system are detected by a power detector 22, and a power control calculator 10 responsive to output signals P and Q from the power detector 22 calculates a current value command I* which is used in combination with each of the reference signals Ui, Vi and Wi to obtain an AC current command i*. An overvoltage suppressing unit 9 responds to a detection value $V_D$ from the voltage detector 6 to generate a signal for triggering the gate of each thyristor switch associated with each power converter unit.

Figure 3:
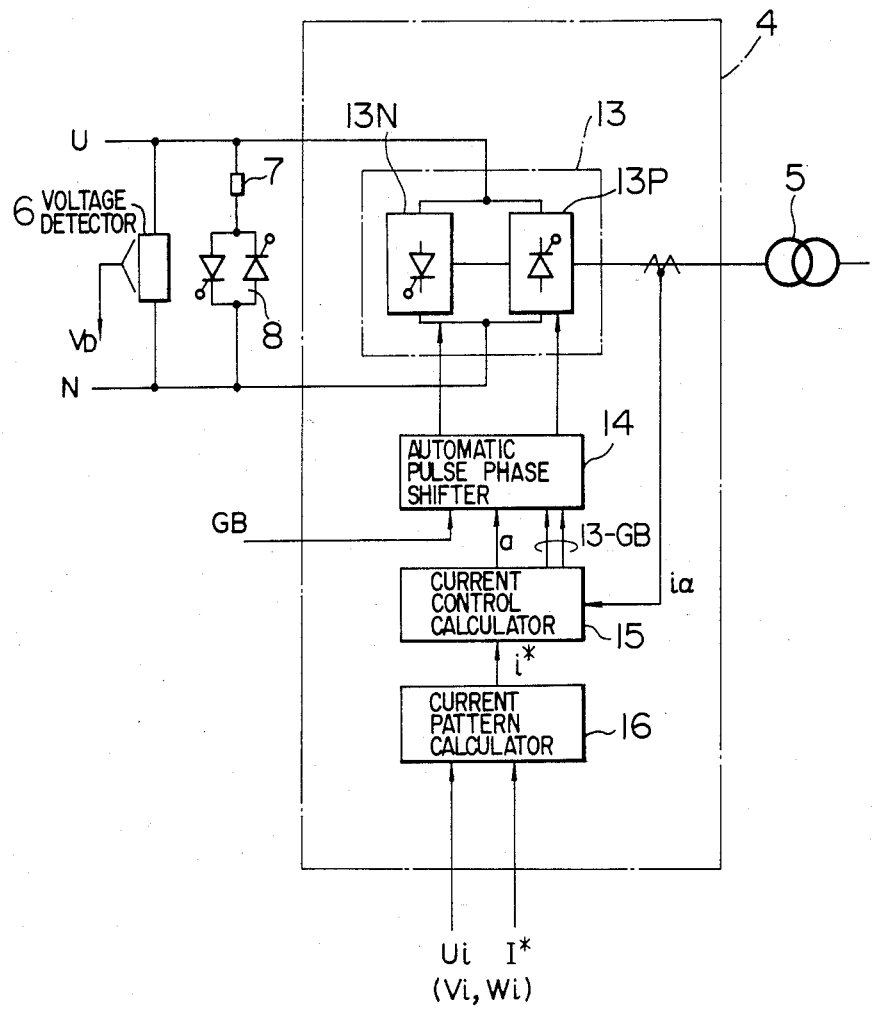
FIG. 3 is a block diagram showing the construction of a power converter unit connected in each phase of the secondary winding.

The circuit construction of the power converter unit 4 is illustrated in FIG. 3. A power converter 13 comprises a forward converter 13P and a backward converter 13N to form a non-circulating current type cyclo-converter. A current pattern calculator 16 responds to the current value command I* (DC value) received from the power control calculator 10 and one of the reference signals Ui, Vi and Wi (Ui in this illustration) delivered out of the reference signal generator 12 to prepare the AC current command i* having the slip frequency. A current control calculator 15 responsive to the AC current command i* and an output current detection value $i_\alpha$ from the cyclo-converter (equal to an input current to the cyclo-converter and so detected at an input port in FIG. 3) to determine a control phase angle a as well as to generate gate polarity signals $\overline{13P\text{-}GB}$ and $\overline{13N\text{-}GB}$ which determine which of the forward converter 13P and backward converter 13N is to be rendered ON or OFF. An automatic pulse phase shifter 14 responds to the output signals from the calculator 15 to generate gate pulses which respectively control conduction of the forward and backward converters of the cyclo-converter 13. The automatic pulse phase shifter 14 also responds to a gate-block signal GB, supplied externally, to exert an instantaneous gate-block function on the converters 13P and 13N.

Figure 4:
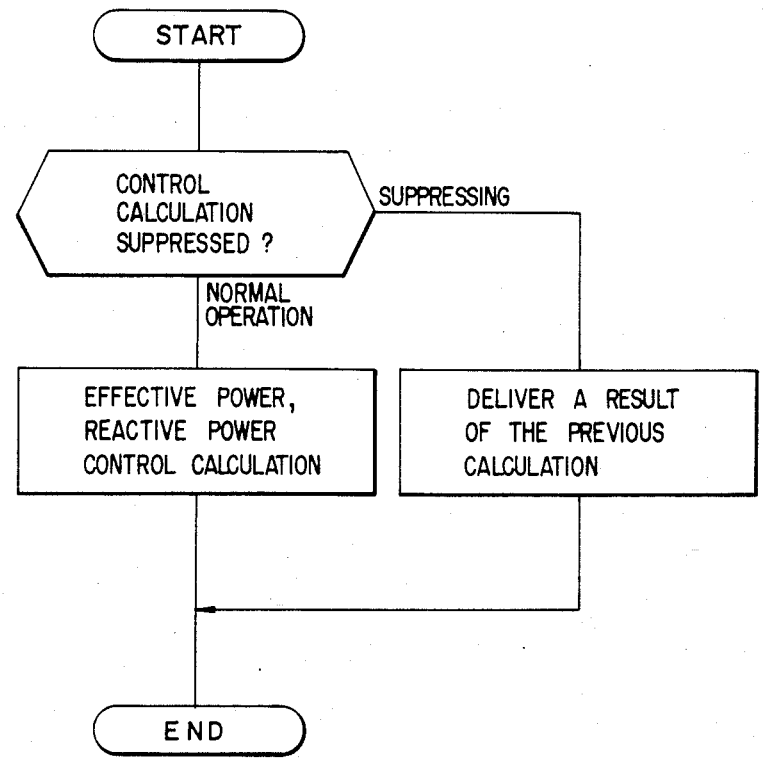
FIG. 4 is a flow chart illustrative of a power control suppressing processing.

As described previously, the power control calculator 10 responds to detection values of actual effective power P and actual reactive power Q detected from the power detector 22 to perform effective power adjusting calculation and reactive power adjusting calculation, thereby calculating the current value command I* (DC value). The calculation of I* is known and will not be detailed herein. The calculator 10 is also responsive to a calculation suppressing signal CS, supplied externally, to inhibit itself form executing the power control calculation and instead permit itself to deliver a result of the previous calculation, as will be seen from FIG. 4.

Figure 2:
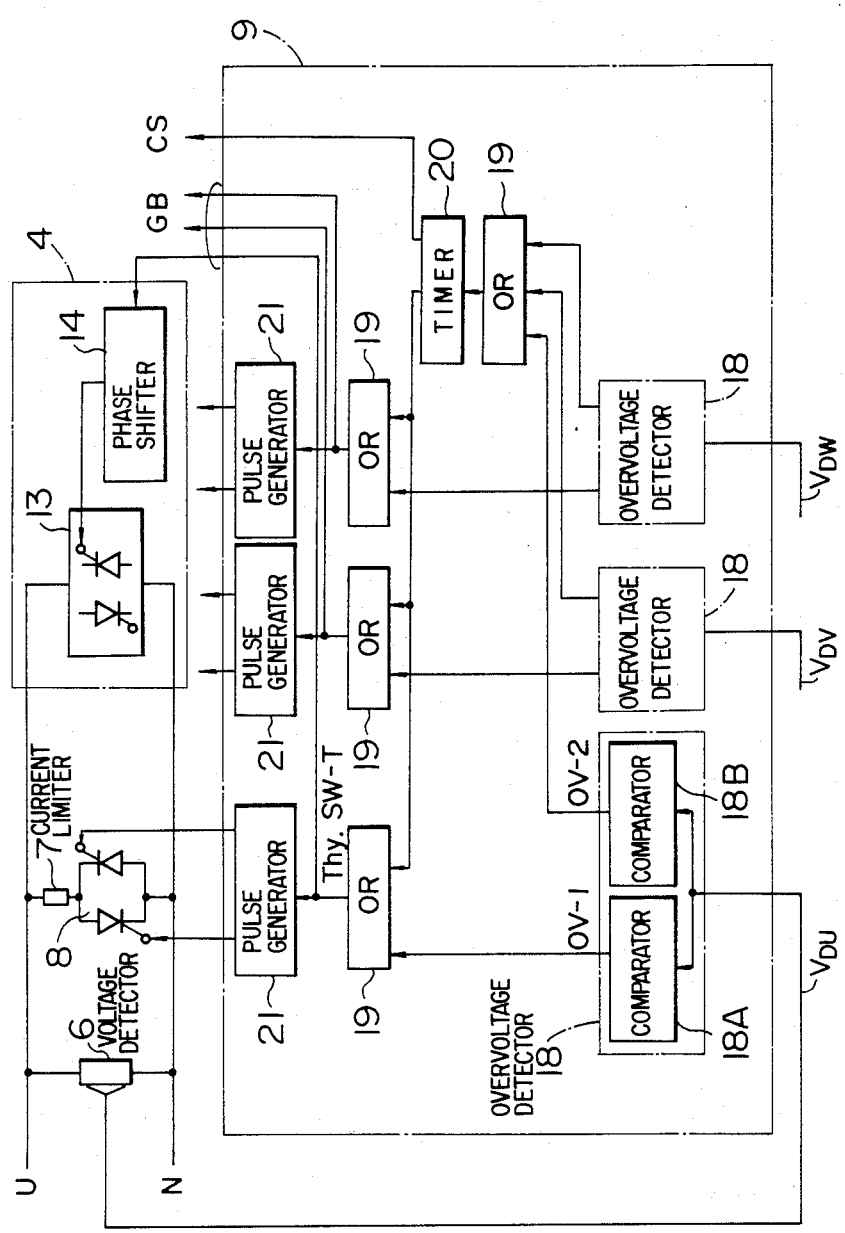
FIG. 2 is a block diagram showing the construction of an overvoltage suppressing unit used in the first embodiment.
Figure 5:
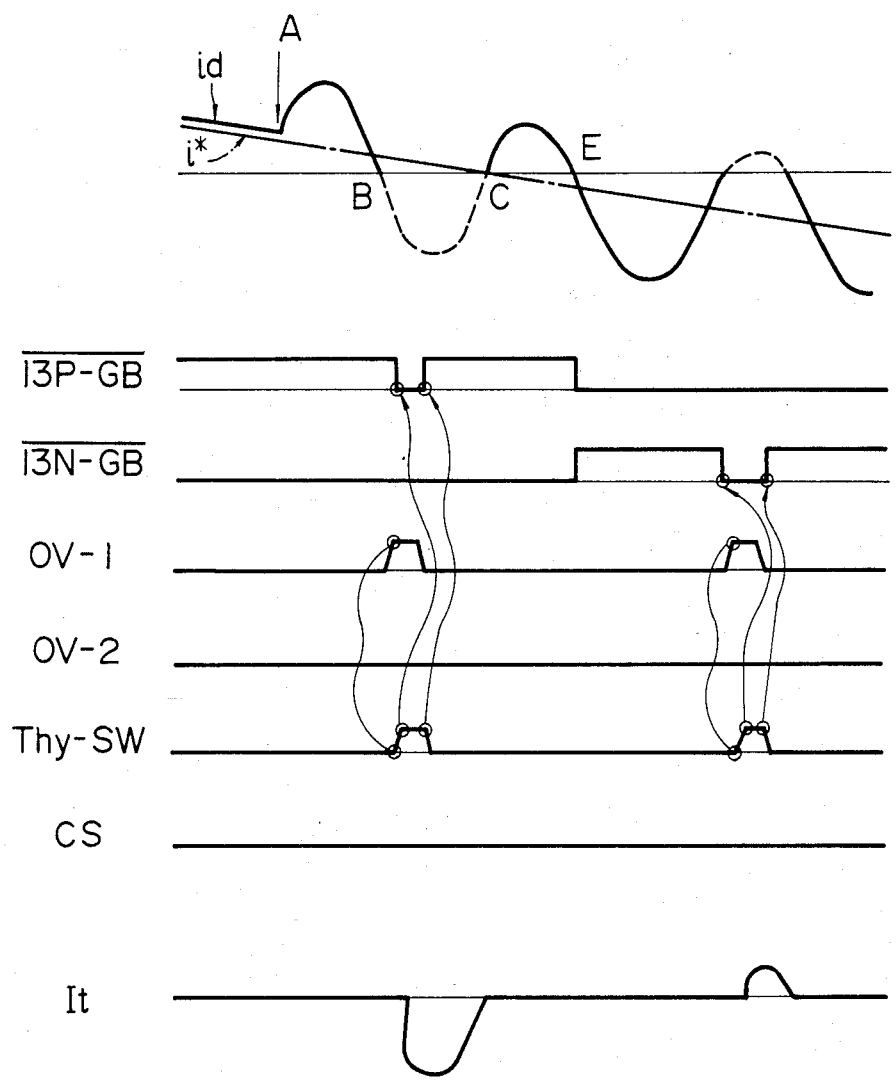
FIG. 5 is a time chart illustrating changes with time of various signals appearing in a first overvoltage level operation.

Referring to FIGS. 2 and 5, an operation will be described wherein an overvoltage of the first level occurs. Assume that the gate polarity signal $\overline{13P\text{-}GB}$ is high and so the forward converter 13P at the cyclo-converter 13 is running. When an accident occurs in the electric power system 1 at time A, a synchronous current id at a frequency comparable to the commercial frequency flows through a phase of the secondary winding of the AC machine 3 and the current is ready to flow through the backward converter 13N of the corresponding cyclo-converter at time B. However, because of the gate polarity signal $\overline{13N\text{-}GB}$ being low for placing the converter 13N in gate-block condition, the current flow is prevented to open the cyclo-converter 13 and a voltage induced in the secondary side of the AC machine 3 is applied across the cyclo-converter 13. This voltage is detected by the voltage detector 6 and applied to comparators 18A and 18B of an overvoltage detector 18. The comparators 18A and 18B are used for detecting an overvoltage of the first level and that of the second level which is higher than the first level. When the overvoltage is higher than the first level, a high-level signal OV-1 is delivered out of the comparator 18A and passed through an OR-gate 19 to provide a high-level thyristor switch trigger signal Thy-Sw-T which activates a pulse generator 21 to turn on the thyristor switch 8. The high-level trigger signal Thy-Sw-T is also applied as the gate-block signal GB to the automatic pulse phase shifter 14 of the power converter unit 4 to instantaneously place the cyclo-converter 13 in gate-block condition. The above operation is carried out only in the phase in which the overvoltage is detected and the cyclo-converters connected in the other phases remain to continue normal operation.

With the thyristor switch turned on, the secondary side of the AC machine is short-circuited in the phase of interest through the current limiting resistor 7 and a secondary current $I_t$ is passed through the thyristor switch. Concurrently therewith, the overvoltage collapses, the thyristor switch 8 is placed in gate-off condition and the gate operation for the cyclo-converter 13 recovers. During an interval of time ranging from recovery of the gate operation and time C, the cyclo-converter 13 generates a voltage opposing to a secondary voltage of AC machine 3 thereby to cancel the thyristor switch current $I_t$. At time C, the thyristor switch current becomes zero and current control is performed by the converter 13P. At time E, the operating converter is switched from 13P to 13N under the direction of the current control calculator 15.

Figure 6:
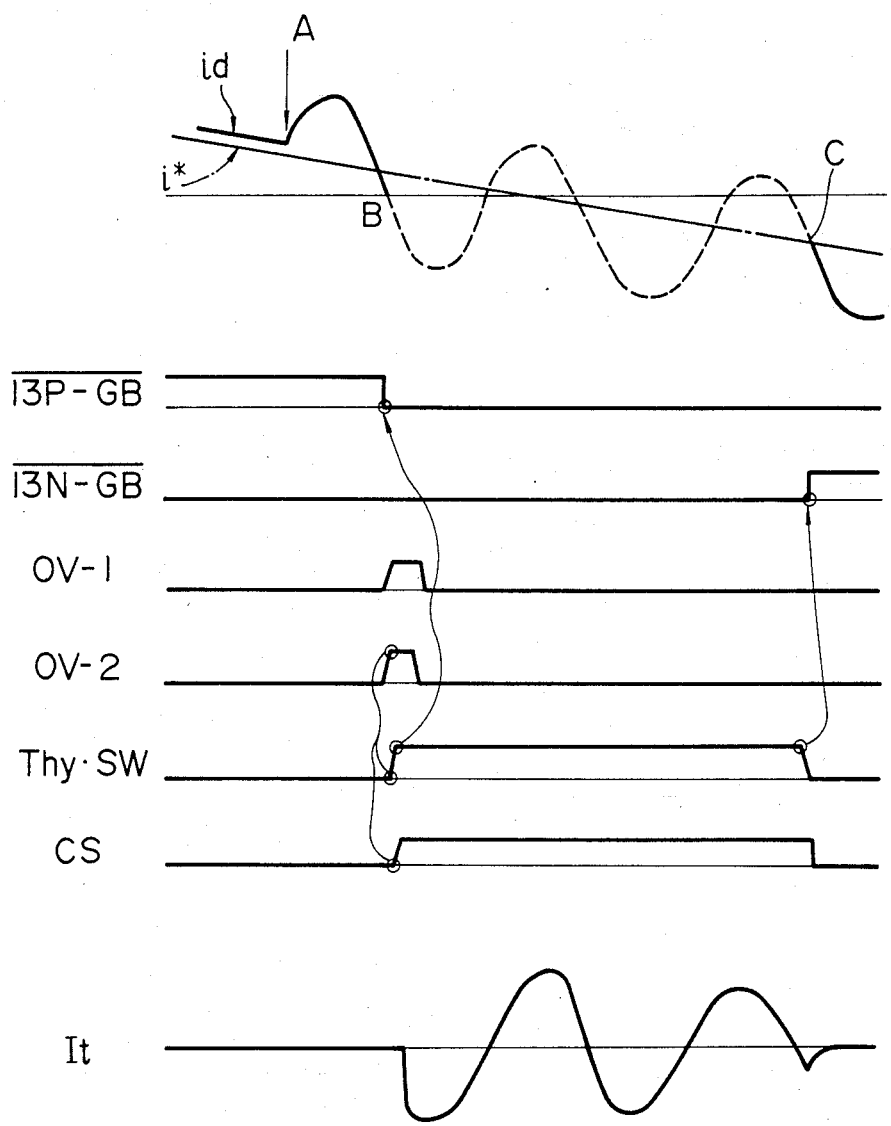
FIG. 6 is a time chart illustrating changes with time of various signals appearing in a second overvoltage level operation.

Referring now to FIGS. 2 and 6, an operation will be described in case of an overvoltage reaching the second level higher than the first level. As in the case of the overvoltage of the first level, it is assumed that an accident occurs in the electric power system 1 at time A during running of the forward converter 13P. At time B, a cyclo-converter 13 is opened and an overvoltage occurs. A voltage detected by the voltage detector 6 is compared at the comparator 18A and 18B of the overvoltage detector 18. In this instance, a high-level signal OV-2 is delivered out of the comparator 18B and applied through a second OR-gate 19 to a timer 20 which actuates immediately upon occurrence of the high-level output OV-2 and resets at a predetermined time delay after disappearance of the high-level output OV-2, thereby providing high-level thyristor switch signals Thy-Sw-T which turn on the thyristor switches 8 associated with all phases. At the same time, the high-level thyristor switch signals are applied as the gate-block signals GB for placing the cyclo-converters 13 of three phases in gate-block condition. Further, the timer 20 produces a high-level power control suppressing signal CS. The power control calculator 10 responds to the signal CS to suppress power control. At the expiration of limit time of the timer 20, the thyristor switch signals Thy-Sw-T and the power control suppressing signal CS become low with the result that the cyclo-converters 13 are released from gate-block condition and recover normal function.

Although the overvoltage has been described as being graded into the first and second levels, an overvoltage actually developing in the secondary winding of the variable speed AC generator/motor in the event of occurrence of an actual accident in the electric power system transiently shifts from the second level to the first level and then falls below a minimum overvoltage level. In accordance therewith, the simultaneous turn-on of the thyristor switches of three phases for full short-circuit on the secondary side through the current limiting resistors can shift to the partial turn-on of only the thyristor switch associated with a phase subject to generation of the overvoltage for short-circuit of that phase through the resistor while making the remaining sound phases alive, thus attaining remarkable advantages that shifting to the steady operation can be achieved more swiftly and that damage of the thyristor elements can be prevented without fail.

Figure 7:
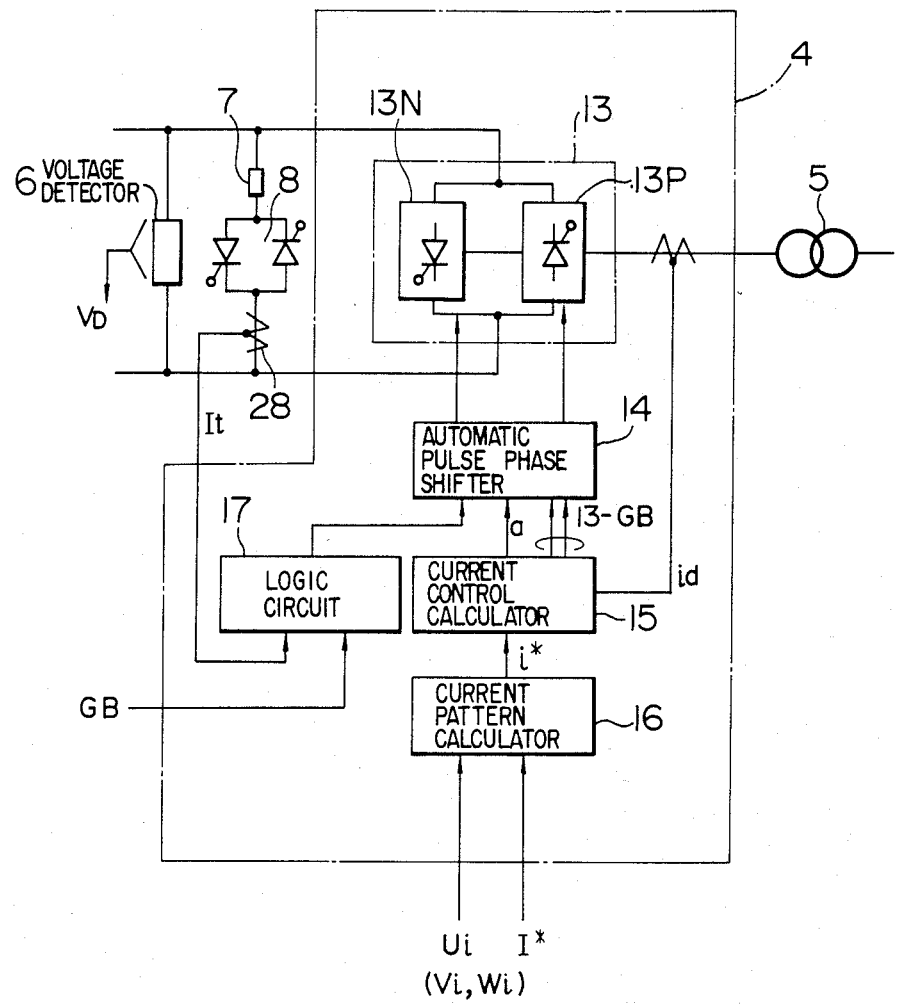
FIG. 7 illustrates a modification of the FIG. 3 power converter unit.

The embodiment of FIG. 3 may be modified as shown in FIG. 7. More particularly, in this modification, a current detector 28 is provided which detects the thyristor switch current $I_t$ when the cyclo-converter recovers from the gate-block condition following turn-on of the thyristor switch, and a logic circuit 17 is added which detects that the current $I_t$ becomes zero and releases the supply of the gate-block signal to the automatic pulse phase shifter 14 on condition that the gate-block signal GB from the overvoltage suppressing unit 9 is low. With this construction, current drawn from the thyristor switch to the cyclo-converter 13 when the cyclo-converter recovers can be inhibited. Further, even with the current limiting resistor 7 being of small resistance, an overcurrent due to short-circuiting at the output of the cyclo-converter 13 which would occur upon recovery of the cyclo-converter 13 can be prevented.

Turning to FIGS. 8 to 12, a second embodiment of the invention will be described. In the first embodiment, an overvoltage appearing at each phase of the secondary winding of the AC generator/motor is detected to decide the occurrence of an accident in the electric power system, while in the second embodiment, the occurrence of an accident in the electric power system is decided on the basis of an overcurrent which may flow through a cyclo-converter depending on the induced secondary voltage of the AC machine. The overcurrent flowing through the cyclo-converter is sorted into two types of which one is due to an accident in the electric power system and the other is dye to an accident in the cyclo-converter itself, and the two types must be discerned from each other. For discrimination, the second embodiment takes advangage of the fact that a difference occurs between input and output currents in the case of an accident in the cyclo-converter itself and that no substantial difference occurs therebetween in the case of an accident in the electric power system.

Figure 8:
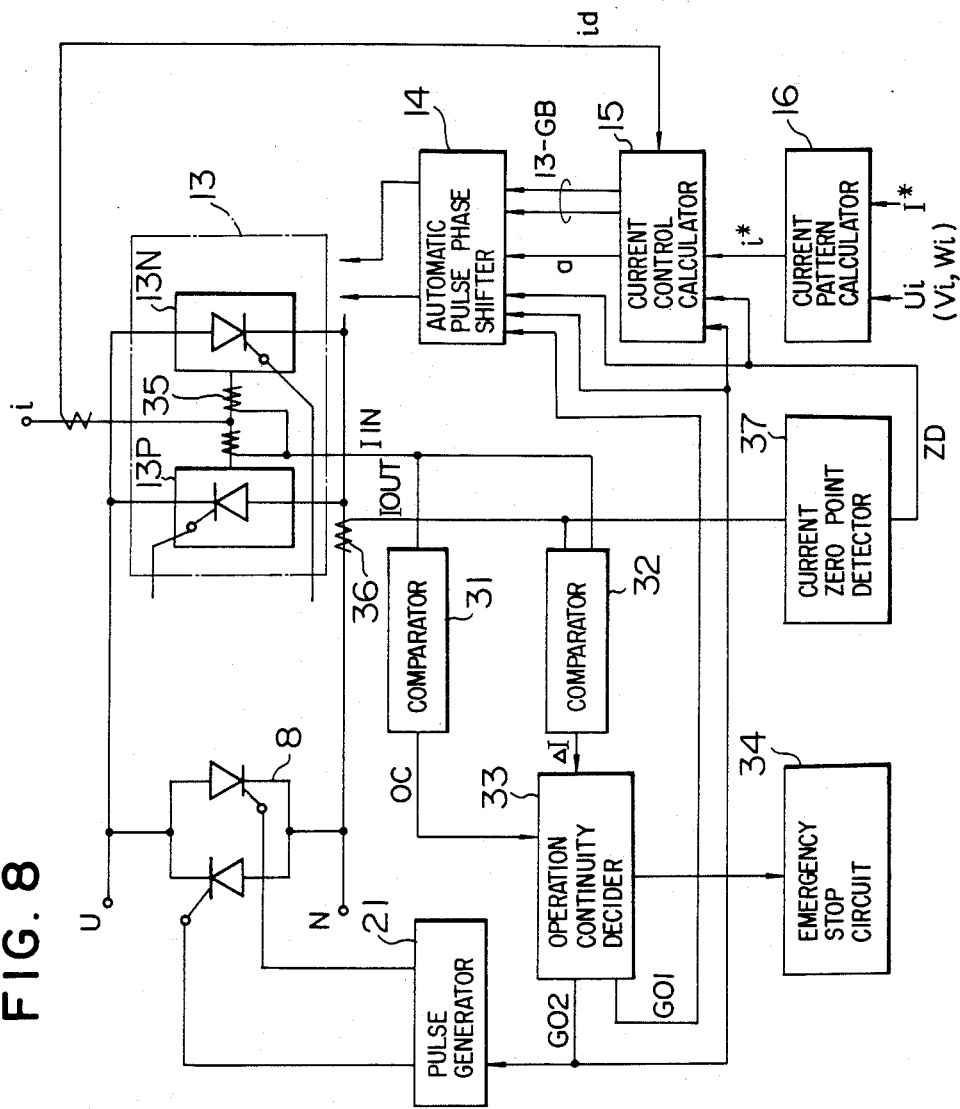
FIG. 8 is a block diagram showing the construction of a protecting apparatus according to a second embodiment of the invention.

The second embodiment substitutes a circuit construction of FIG. 8 for the FIG. 3 circuit construction of the first embodiment. In FIG. 8, components identical to or like those of FIG. 3 are designated by identical reference numerals. As in the case of FIG. 3, a thyristor switch circuit 8 for absorbing an overcurrent in each phase of the secondary winding of the AC generator/motor is connected in each phase of the secondary winding (in each phase output of a cyclo-converter). A current limiting resistor 7 may be connected in series with the circuit 8 as shown in FIG. 3 but is omitted herein for simplicity of illustration. There are seen an automatic pulse phase shifter 14, a current control calculator 15, a current pattern calculator 16 and a pulse generator 21 which function in substantially the same manner as those of FIG. 3. The circuit of FIG. 8 operates as follows.

In each phase, a current detector 35 for detecting an input current IIN to a cyclo-converter 13 is connected and a current detector 36 for detecting an output current IOUT from the cyclo-converter is connected. A comparator 31 produces a signal OC which is high to assume "1" when the input current IIN is larger than a predetermined value and assumes "0" when the input current IIN is not larger than the predetermined value. The signal OC of "1" indicates that the input current is higher than a normal value and is recognized as an overcurrent. A comparator 32 compares the input current IIN with the output current IOUT and produces a difference $\Delta I = IIN - IOUT$.

Figure 9:
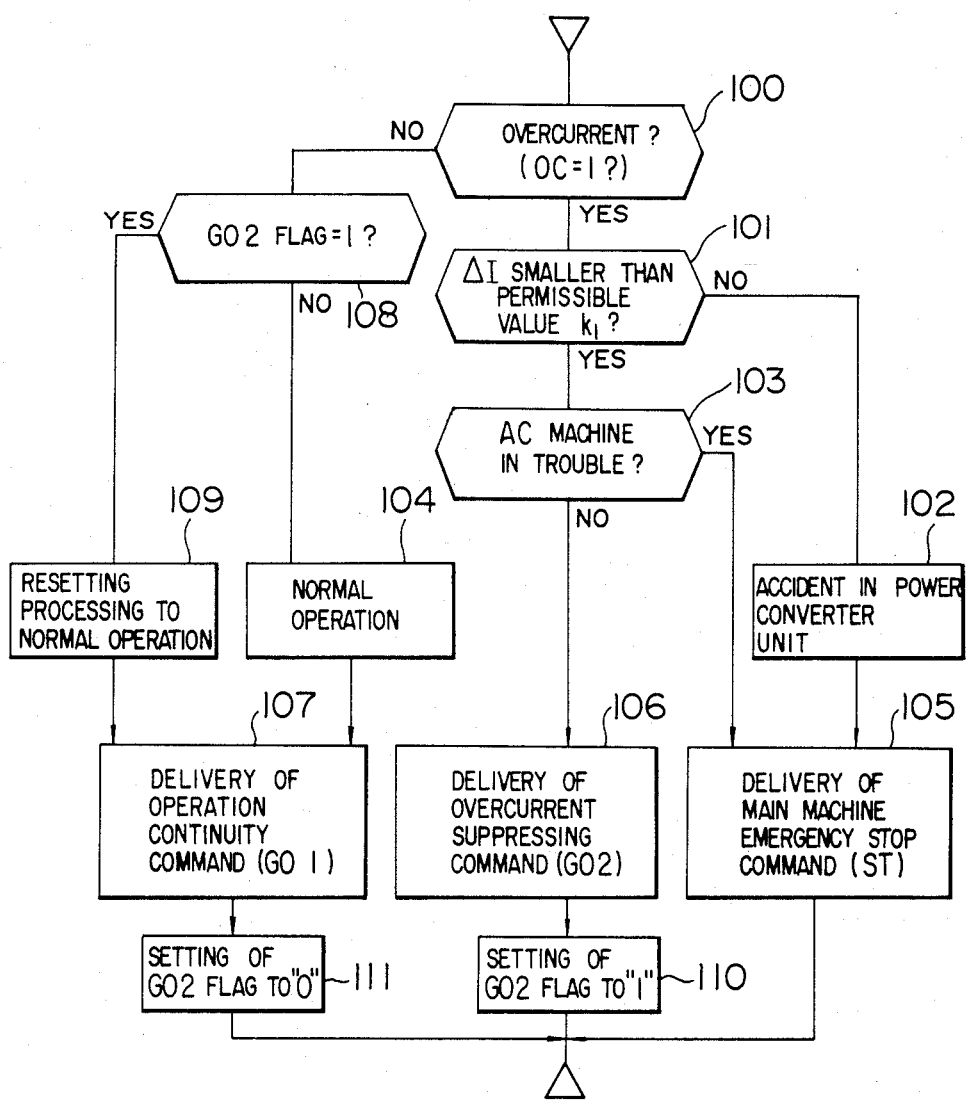
FIG. 9 is a flow chart illustrative of execution steps in an operation continuity decider used in the FIG. 8 embodiment.

An operation continuity decider 33 including a microcomputer receives the output signal OC from the comparator 31 and the output signal $\Delta I$ from the comparator 32 and carries out processings as shown in FIG. 9. Firstly, it is decided whether the output signal OC of the comparator 31 is "1" or "0", i.e., whether the input current IIN is an overcurrent or not (step 100). If OC=0, normality is decided (step 104) and an operation continuity command GO1 is sent to the automatic pulse phase shifter 14 (step 107) to continue normal operation. Even with OC=0, when this results from recovering from a suppressing control operation to be described later, there is provided a resetting processing to normal operation (step 109). Accordingly, following the step 100, it is first decided whether a GO2 flag is "1" indicative of recovering from the suppressing control or not (step 108). If "0", the procedure proceeds to step 104 and if "1", the procedure proceeds to step 107 after completion of the resetting processing in the step 109 and the GO2 flag is reset to "0" in step 111 following the step 107. The contents of the resetting processing in step 109 are enumerated in the following:

(i) The contents of the current control calculator 15 placed in a condition prior to the detection of the overcurrent is initialized on the basis of a currently prevailing circuit current; and (ii) The current pattern calculator 16 is initialized by applying thereto information on the present turn-on status of the forward and backward converters.

On the other hand, if the output signal OC from the comparator 31 is "1", a value of the output signal $\Delta I$ from the comparator 32 is additionally decided (step 101). If $\Delta I$ is smaller than a permissible value $K_1$ indicating that the AC machine is not in trouble, it is decided that the overcurrent is due to an accident in the electric power system or due to a breaker operation in another AC machine (step 103) and an overcurrent suppressing control command GO2 is sent to the pulse generator 21 and automatic pulse phase shifter 14 (step 106). Following the step 106, the GO2 flag is set to "1" in step 110 to perform the resetting processing (step 109) to the normal operation.

When a value of the output signal $\Delta I$ from the comparator 32 exceeds the permissible value $K_1$, it is decided that the overcurrent is due to an accident occurring in the power converter unit 13 (step 102) and a master machine emergency stop command ST is sent to an emergency stop circuit 34 (step 105).

Since there is a possibility that $\Delta I$ is smaller than the permissible value $K_1$ even in the event of an accident occurring in the AC machine, it is decided in the step 103 following the step 101 whether the accident occurs in the AC machine or not. If an accident in the AC machine is decided, the overcurrent suppressing control is not executed and the procedure proceeds to the step 105, in which as in the case of the accident in the power converter unit, the master machine emergency stop command ST is sent to the emergency stop circuit 34.

Figure 12:
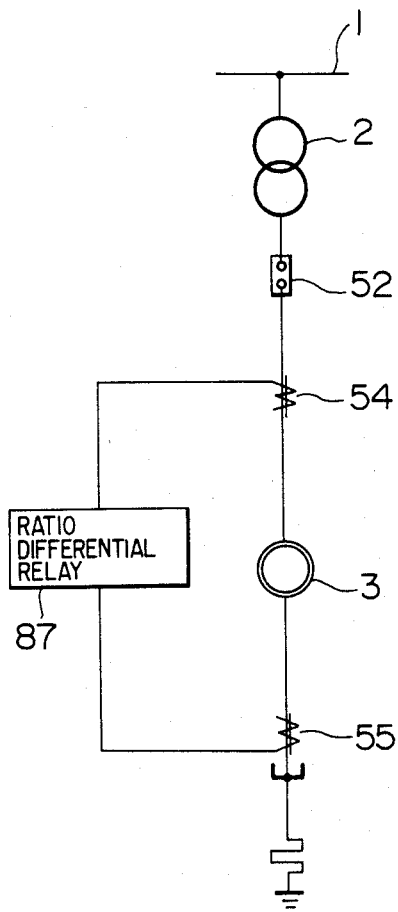
FIG. 12 schematically illustrates a circuit diagram of a detector for detecting an accident occurring in the AC generator/motor itself.

An accident in the AC machine can be detected by a circuit as shown in FIG. 12. Referring to FIG. 12, the stator side of the AC generator/motor 3 is connected to the electric power system 1 through the system breaker 52 and main transformer 2. For detection of an accident in the generator/motor 3, a ratio differential relay 87 is used which is connected to current detectors 54 and 55 connected to opposite ends of a winding of each phase. In the event that the generator/motor encounters a problem, different currents flow through the current detectors 54 and 55 so that the ratio differential relay 87 is operated to produce a high-level signal "1". This signal is used to execute the decision step 103 of FIG. 9.

Figure 13:
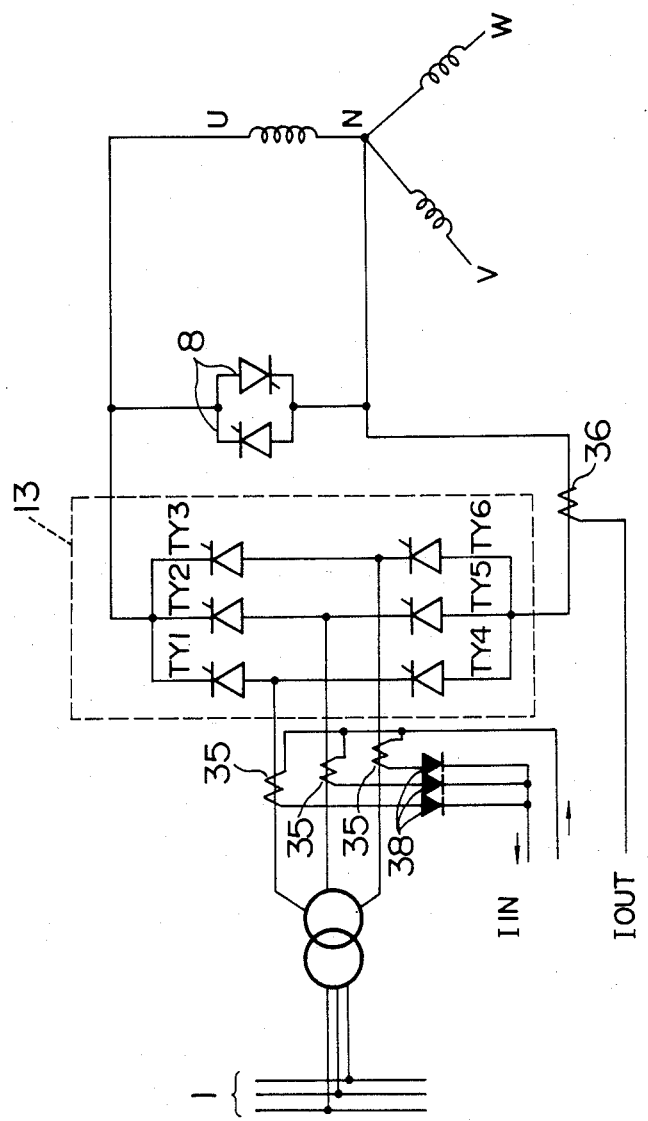
FIG. 13 is a block diagram of a circuit for detecting input/output current of the power converter unit.

Circuit connections associated with the current detectors 35 and 36 are illustrated in FIG. 13. The receiving transformer 5 connected to the electric power system 1 feeds AC power to the cyclo-converter 13. In FIG. 13, only the forward converter is illustrated. The output current produced from the cyclo-converter 13 is passed through the rotor coil U of the generator/motor 3 to provide an exciting current for one phase of the generator/motor 3. The rotor coils V and W are similarly connected to the cyclo-converter 13 so that three phases of the generator/motor 3 may be AC excited. The input current detector 35 is connected in each phase on the secondary side of the receiving transformer 5, and output signals from the three detectors are rectified by rectifiers 38. Rectified signals are added together to provide the input current IIN to the cyclo-converter. The output current detector 36 is connected on the output side of the cyclo-converter 13 and produces an output signal serving as the cyclo-converter output current IOUT.

The cyclo-converter 13 comprises six thyristor elements TY1 to TY6, wherein TY1 is combined with TY6 or TY5, TY2 is combined with TY4 or TY6 and TY3 is combined with TY4 or TY5 and gate triggering is controlled such that two thyristor elements of any one of the above sets are always turned on. Accordingly, the input current IIN has substantially the same waveform as that of the output current IOUT and both the currents can be compared with each other.

The operation for issuing the overcurrent suppressing control command GO2 in the step 106 of FIG. 9 will now be described in greater detail. As is clear from FIG. 8, the command GO2 is on the one hand applied to the pulse generator 21 to close the thyristor switch 8 in order that the overcurrent which otherwise fully flows into the cyclo-converter 13 can be absorbed by the thyristor switch 8 to reduce the amount of the overcurrent flowing into the cyclo-converter. At the same time, the command GO2 is on the other hand applied to the automatic pulse phase shifter 14 and current control calculator 15. As a result, the current control calculator 15 interrupts its operation and retains a calculation result at that time, and the automatic pulse phase shifter 14 instantaneously places the converters 13P and 13N in gate-block condition as in the case of the first embodiment. Alternatively, a current zero point detector 37 of FIG. 8 detects the zero point of the output current from the cyclo-converter and a thus detected zero point signal ZD (this signal being synchronous with the rotating frequency as will be seen from FIG. 5) is used to control forward/backward switching of the cyclo-converter 13. The cyclo-converter is normally driven at the slip frequency but when the command GO2 is issued, the forward/backward switching is effected in timed relationship with the rotating frequency.

The operation of the operation continuity decider 33 will be described with reference to FIGS. 10 and 11.

Figure 10:
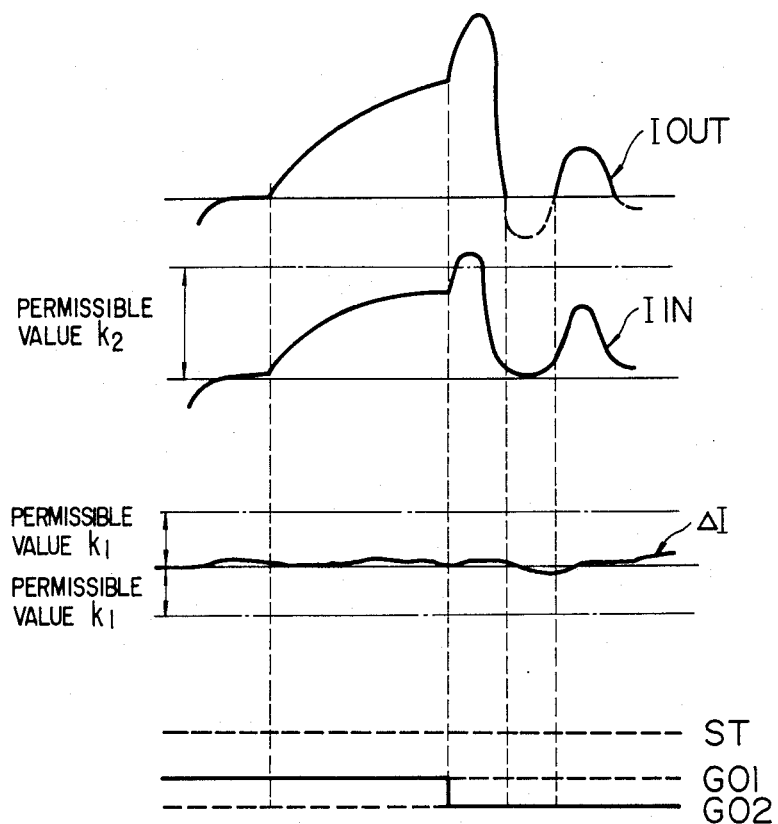
FIG. 10 is a waveform diagram for explaining the operation of the operation continuity decider when an accident occurs in the electric power system.

Upon occurrence of an accident in the electric power system, the input current IIN obtained through the cyclo-converter input current detector 35 has substantially the same waveform as that of the output current IOUT and the output signal ΔI from the comparator 32 becomes substantially zero, as illustrated in FIG. 10. Since the overcurrent exceeds a permissible value $K_2$ (for example, 3.0 units or more, one unit indicating a rated current) at that time, the operation continuity decider 33 issues the overcurrent suppressing control command GO2 for suppressing the overcurrent.

Figure 11:
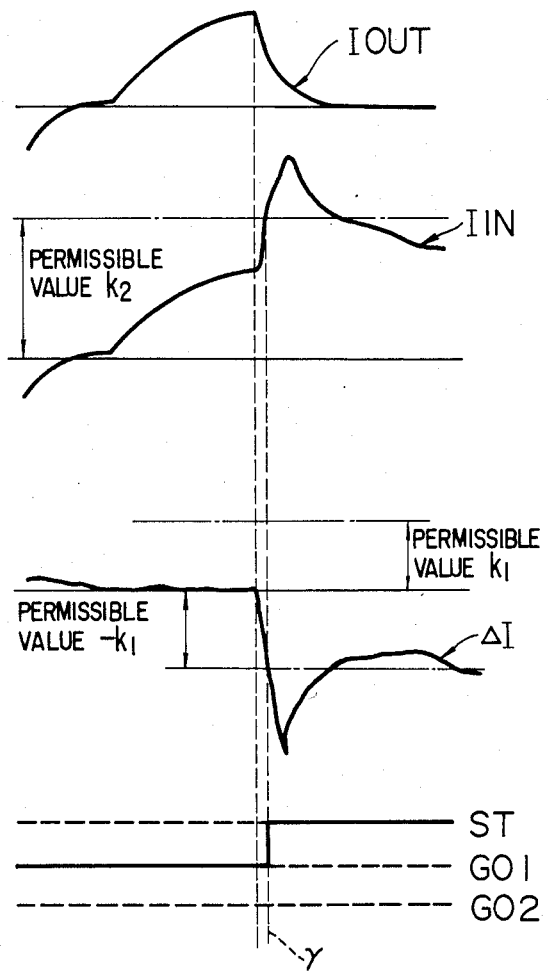
FIG. 11 is a waveform diagram for explaining the operation of the operation continuity decider when a failure to commutate by a cyclo-converter occurs.

FIG. 11 shows waveforms appearing when a failure to commutate by the cyclo-converter occurs. In this accident, the forward converter 13P and the backward converter 13N of the cyclo-converter are simultaneously placed in gate-on condition to establish a closed circuit, with the result that an overcurrent flows through the current detector 35, exceeding the permissible value $K_2$ as in the case of the accident in the electric power system.

On the other hand, the output current IOUT detected by the current detector 36 becomes zero. Consequently, the absolute value of the output signal ΔI from the comparator 32 exceeds the permissible value $K_1$. At time r that the permissible value $K_1$ is exceeded, the operation continuity decider 33 issues the main machine emergency stop command ST.

In this manner, whether the accident occurs in the cyclo-converter or in the electric power system can readily be decided by detecting the input and output currents of the cyclo-converter. Further, even with the power converter unit comprised of the non-circulating type cyclo-converter, the thyristor phase control can remain continued even when an accident occurs in the electric power system. This permits continuous generation or pumping-up operation even when a transient phenomenon occurs in the electric power system 1, thus attaining a highly reliable protecting apparatus.

As described above, the present invention is concerned with the protecting apparatus for the secondary excitation type variable speed AC generator/motor connected to the electric power system and has been separately described by referring to an instance (first embodiment) wherein an overvoltage appearing at each phase of the secondary winding of the AC generator/motor is detected to operate the protecting means and another instance (second embodiment) wherein an overcurrent is detected to operate the protecting means. However, in any instances, when the overvoltage or overcurrent meets a predetermined condition, only the protecting means connected in the corresponding phase is actuated, thereby ensuring that the AC generator/motor can continue to operate until the electric power system recovers from the accident and hence stability of the electric power system can be improved. The first embodiment may be used in combination with the second embodiment to permit more accurate controlling.

We claim:

1. A protecting apparatus for a secondary excitation type variable speed AC generator/motor having a primary winding connected to an electric power system and a secondary winding each phase of which is AC excited by an independent power converter unit, said protecting apparatus comprising:

means for detecting an electrical event which includes at least one of overvoltge and overcurrent appearing at any phase of the secondary winding of said AC generator/motor;

a switch circuit connected in each phase of the secondary winding of said AC generator/motor;

means for deciding whether said detected electrical event meets a predetermined condition; and means for closing, when said electrical event detected in any phase of the secondary winding is decided as meeting said predetermined condition, said switch circuit connected in the corresponding phase of the secondary winding.

2. A protecting apparatus according to claim 1 wherein said electrical event is an overvoltage appearing at each phase of the secondary winding.

3. A protecting apparatus according to claim 2 wherein said detecting means comprises means for detecting a voltage appearing in each phase of the secondary winding and a first comparator for comparing the detected voltage with a first predetermined level.

4. A protecting apparatus according to claim 3, wherein said deciding means comprises a second comparator for comparing the detected voltage with a second level which is higher than said first predetermined level and decides that said predetermined condition is satisfied when said decided voltage is higher than said first level but lower than said second level.

5. A protecting apparatus according to claim 4 wherein said switch circuit comprises a series circuit of a semiconductor switch and a current limiting resistor.

6. A protecting apparatus according to claim 1 wherein said electrical event is an overcurrent flowing through each phase of the secondary winding.

7. A protecting apparatus according to claim 6 wherein said detecting means comprises means for detecting an input current to said power converter unit connected in each phase of the secondary winding, and a first comparator for comparing the detected input current with a predetermined level.

8. A protecting apparatus according to claim 7 wherein said deciding means comprises means for detecting an output current from said power converter unit connected in each phase of the second winding, a second comparator for determining a difference between said detected input current and the output current of said power converter unit connected in that phase of the secondary winding, and said deciding means decides that said overcurrent meets said predetermined condition when the difference between said input current and said output current is smaller than a predetermined level.

9. An apparatus for protecting a power converter system for use with a secondary excitation type multiphase variable speed AC generator/motor having a primary winding connected to an electric power system and a secondary winding in which each phase is AC excited, said power converter system being connected between the electric power system and said secondary winding and including a plurality of independent power converter units for AC exciting the respective phases of said secondary winding of said AC generator/motor, said apparatus comprising:

means for detecting an electrical event which includes at least one of an overvoltage and overcurrent appearing at each of the power converter units;

switch means associated with each of said power converter units, said switch means normally being in an opening state for enabling the associated power converter unit to operate normally, and being operative in a closing state to protect the associated power converter unit from at least one of the overvoltage and overcurrent;

means for deciding whether the electrical event detected in each of the power converter units meets a predetermined condition; and means associated with each power converter unit for holding said switch means of a respective power converter unit in the closing state thereof in response to the deciding means deciding that the electrical event in the power converter unit associated with one phase of said secondary winding meets the predetermined condition thereby protecting the power converter unit for the one phase from at least one of the overvoltage and overcurrent and enabling the power converter units associated with other phases of said secondary winding to operate normally.

10. A protecting apparatus according to claim 9, wherein said electrical event is an overvoltage at the associated power converter unit.

11. A protecting apparatus according to claim 10, wherein said detecting means comprises means for detecting a voltage appearing at the associated power converter unit, and a first comparator for comparing the detected voltage with a first predetermined level.

12. A protecting apparatus according to claim 11, wherein said deciding means comprises a second comparator for comparing the detected voltage with a second level which is higher than said first predetermined level and for deciding that said predetermined condition is satisfied when said decided voltage is higher than said first level but lower than said second level, and further comprising means for rendering said switch means associated with each of said power converter units in the closing state thereof when the detected voltage appearing in any of said power converter units is higher than said second level, and for holding all of said switch means in the closing state thereof for a predetermined period of time after disappearance of the detected voltage higher than said second level.

13. A protecting apparatus according to claim 12, wherein said switching means includes a series circuit of a semiconductor switch and a current limiting resistor.

14. A protecting apparatus according to claim 9, wherein said electrical event is an overcurrent flowing through the associated power converter unit.

15. A protecting apparatus according to claim 14, wherein said detecting means comprises means for detecting an input current to the associated power converter unit, and a first comparator for comparing the detected input current with a predetermined level.

16. A protecting apparatus according to claim 15, wherein said deciding means comprises means for detecting an output current from the associated power converter unit, a second second comparator for determining a difference between said detected input current and said detected output current of the associated power converter unit, said deciding means deciding that said overcurrent meets said predetermined condition when the difference between said input current and said output current is smaller than a predetermined level.

17. A protecting apparatus according to claim 16, further comprising means for stopping the power converter system when said deciding means decides that the difference between said input current and said output current of any one of the power converter units is larger than said predetermined level.

* * * * *